(12) United States Patent
Arai

(10) Patent No.: US 9,049,368 B2
(45) Date of Patent: Jun. 2, 2015

(54) IMAGING DEVICE AND IMAGING METHOD INCLUDING PREDICTIVE COMPOSITION

(71) Applicant: Olympus Imaging Corp., Shibuya-ku, Tokyo (JP)

(72) Inventor: Hirozumi Arai, Machida (JP)

(73) Assignee: Olympus Imaging Corp., Tokyo (JP)

( * ) Notice: Subject to any disclaimer, the term of this patent is extended or adjusted under 35 U.S.C. 154(b) by 0 days.

(21) Appl. No.: 14/031,766

(22) Filed: Sep. 19, 2013

(65) Prior Publication Data
US 2014/0085490 A1 Mar. 27, 2014

(30) Foreign Application Priority Data
Sep. 21, 2012 (JP) .................................. 2012-208563

(51) Int. Cl.
*H04N 5/228* (2006.01)
*H04N 5/232* (2006.01)
*H04N 5/225* (2006.01)

(52) U.S. Cl.
CPC ......... *H04N 5/23222* (2013.01); *H04N 5/2259* (2013.01); *H04N 5/23216* (2013.01)

(58) Field of Classification Search
CPC ............ H04N 5/23222; H04N 5/2259; H04N 5/233216

USPC ................................... 348/119, 208.14, 222.1
See application file for complete search history.

(56) References Cited

U.S. PATENT DOCUMENTS

| 2006/0155466 | A1* | 7/2006 | Kanda et al. | 701/209 |
| 2008/0195315 | A1* | 8/2008 | Hu et al. | 701/212 |
| 2010/0268451 | A1* | 10/2010 | Choi | 701/201 |
| 2011/0298599 | A1* | 12/2011 | Oonishi | 340/425.5 |

FOREIGN PATENT DOCUMENTS

JP 2012-020632 2/2012

* cited by examiner

*Primary Examiner* — Gevell Selby
(74) *Attorney, Agent, or Firm* — John C. Pokotylo; Straub & Pokotylo

(57) ABSTRACT

An imaging device includes an imaging unit, a display unit, a position acquisition unit, a map information acquisition unit, a composition prediction unit, and a display control unit. The imaging unit acquires a subject image within an imaging range. The display unit displays an image. The position acquisition unit acquires a present location. The map information acquisition unit acquires map information including the present location. The composition prediction unit calculates a predictive composition based on the present location and the map information. The display control unit causes the display unit to display the predictive composition.

14 Claims, 14 Drawing Sheets

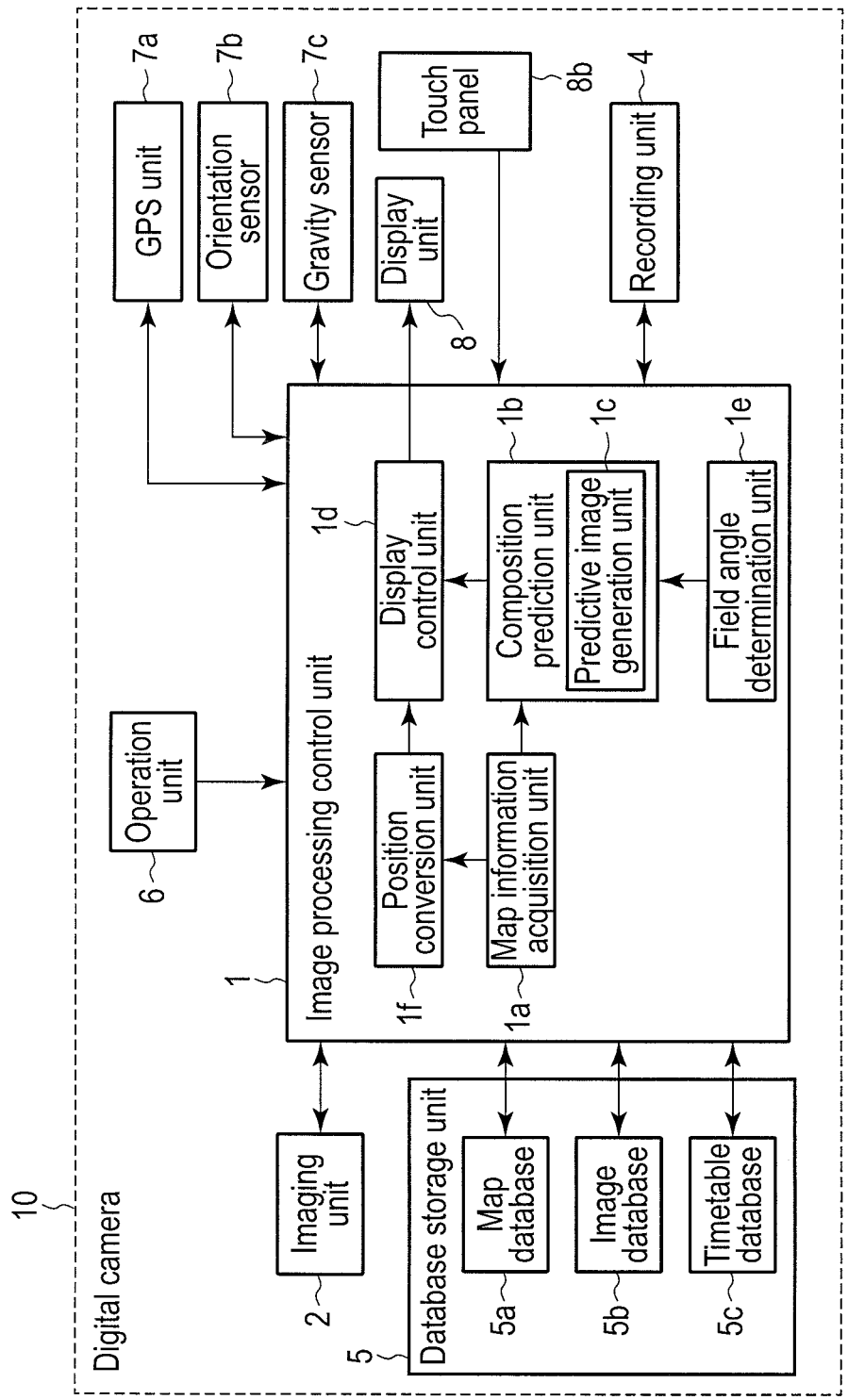
F I G. 1

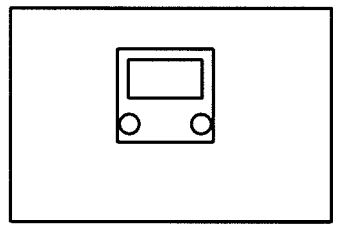
F I G. 5A
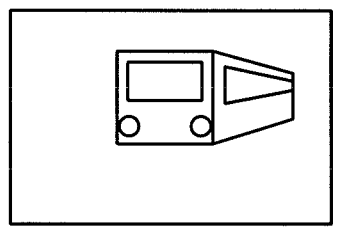
F I G. 5B
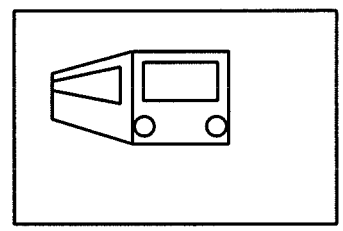
F I G. 5E
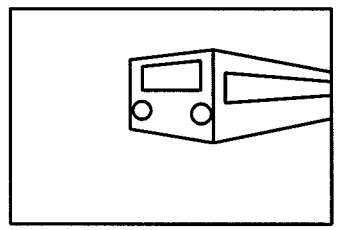
F I G. 5C
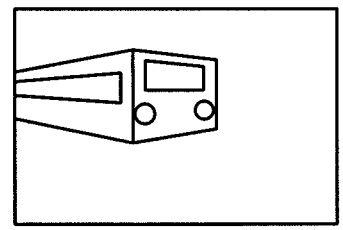
F I G. 5F
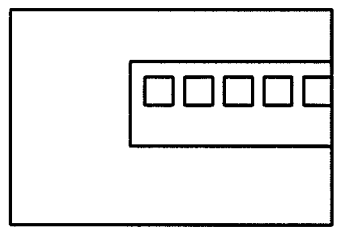
F I G. 5D
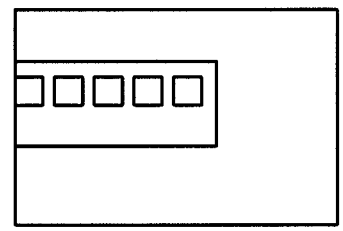
F I G. 5G

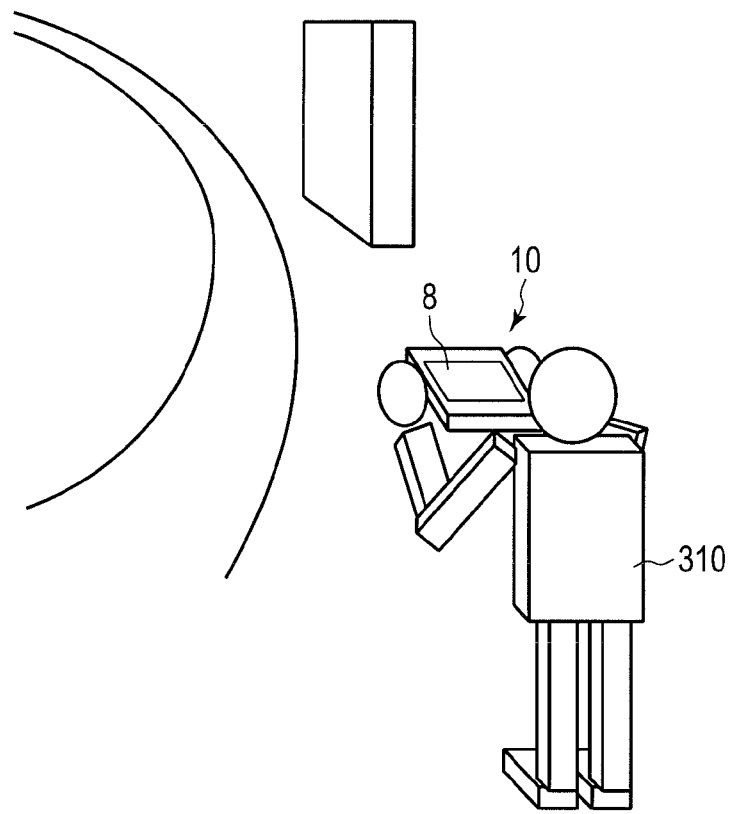
F I G. 7
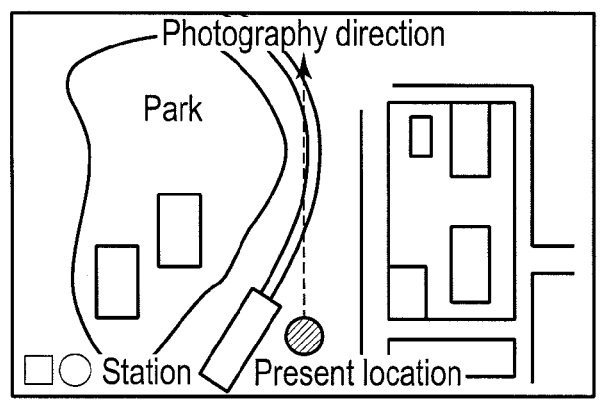
F I G. 8

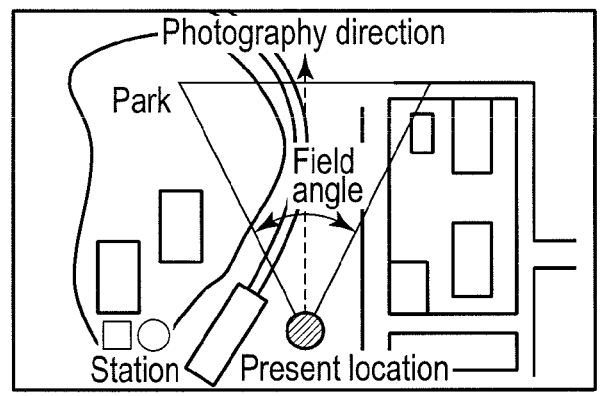
F I G. 13
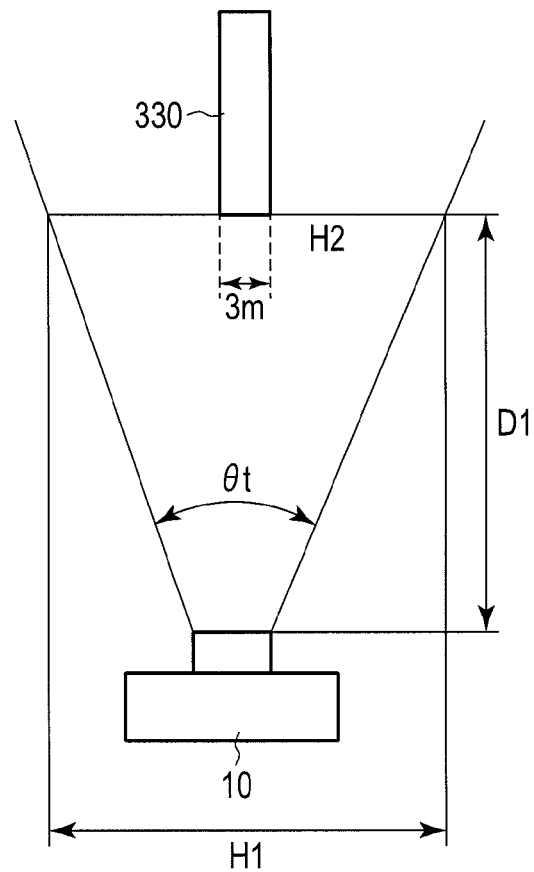
F I G. 14

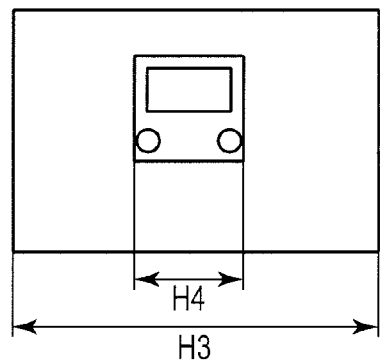
F I G. 15
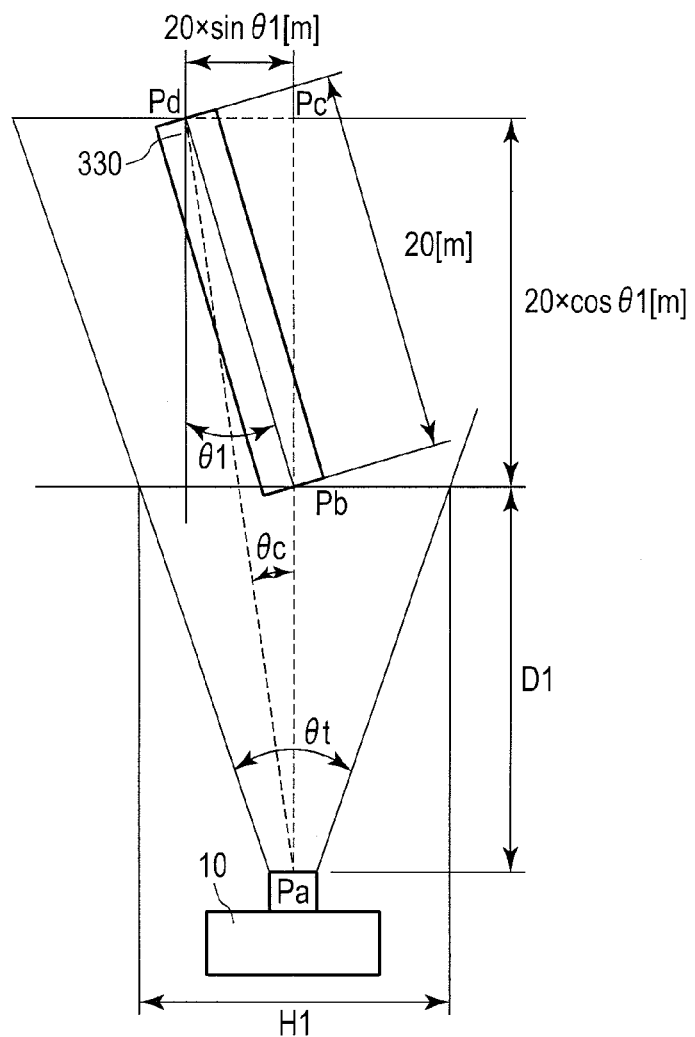
F I G. 16

IMAGING DEVICE AND IMAGING METHOD INCLUDING PREDICTIVE COMPOSITION

CROSS-REFERENCE TO RELATED APPLICATIONS

This application is based upon and claims the benefit of priority from prior Japanese Patent Application No. 2012-208563, filed Sep. 21, 2012, the entire contents of which are incorporated herein by reference.

BACKGROUND OF THE INVENTION

1. Field of the Invention

The present invention relates to an imaging device.

2. Description of the Related Art

Railroads are a popular subject for photography enthusiasts. For attractive railroad photography, pictures are taken at a photography spot which is chosen from places along railroads on the basis of, for example, the background. Various techniques have been provided to assist railroad photographers. For example, a technique disclosed in Jpn. Pat. Appln. KOKAI Publication No. 2012-020632 is concerned with a method of displaying a time at which a train passes a given point on a train passage, for example, a given point between stations. For example, a photographer can use the technique according to Jpn. Pat. Appln. KOKAI Publication No. 2012-020632 to know the time at which a train passes a photography spot.

BRIEF SUMMARY OF THE INVENTION

According to an aspect of the present invention, an imaging device includes an imaging unit configured to acquire a subject image within an imaging range; a display unit configured to display an image; a position acquisition unit configured to acquire a present location; a map information acquisition unit configured to acquire map information including the present location; a composition prediction unit configured to calculate a predictive composition based on the present location and the map information; and a display control unit configured to cause the display unit to display the predictive composition.

Advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a block diagram showing a configuration example of an imaging device according to embodiments;

FIGS. 5A, 5B, 5C, 5D, 5E, 5F, and 5G are diagrams showing examples of predictive images of a train included in an image database according to the first embodiment;

FIG. 7 is a diagram illustrating an example of how to use a digital camera according to the first embodiment;

FIG. 8 is a diagram showing an example of a map image displayed on the display unit according to the first embodiment;

FIG. 13 is a diagram showing an example of a map image displayed on the display unit according to the second embodiment;

FIG. 14 is a diagram illustrating an example of a composition prediction method according to the second embodiment;

FIG. 15 is a diagram illustrating an example of the composition prediction method according to the second embodiment;

FIG. 16 is a diagram illustrating an example of the composition prediction method according to the second embodiment;

DETAILED DESCRIPTION OF THE INVENTION

First Embodiment

Figure 2A:
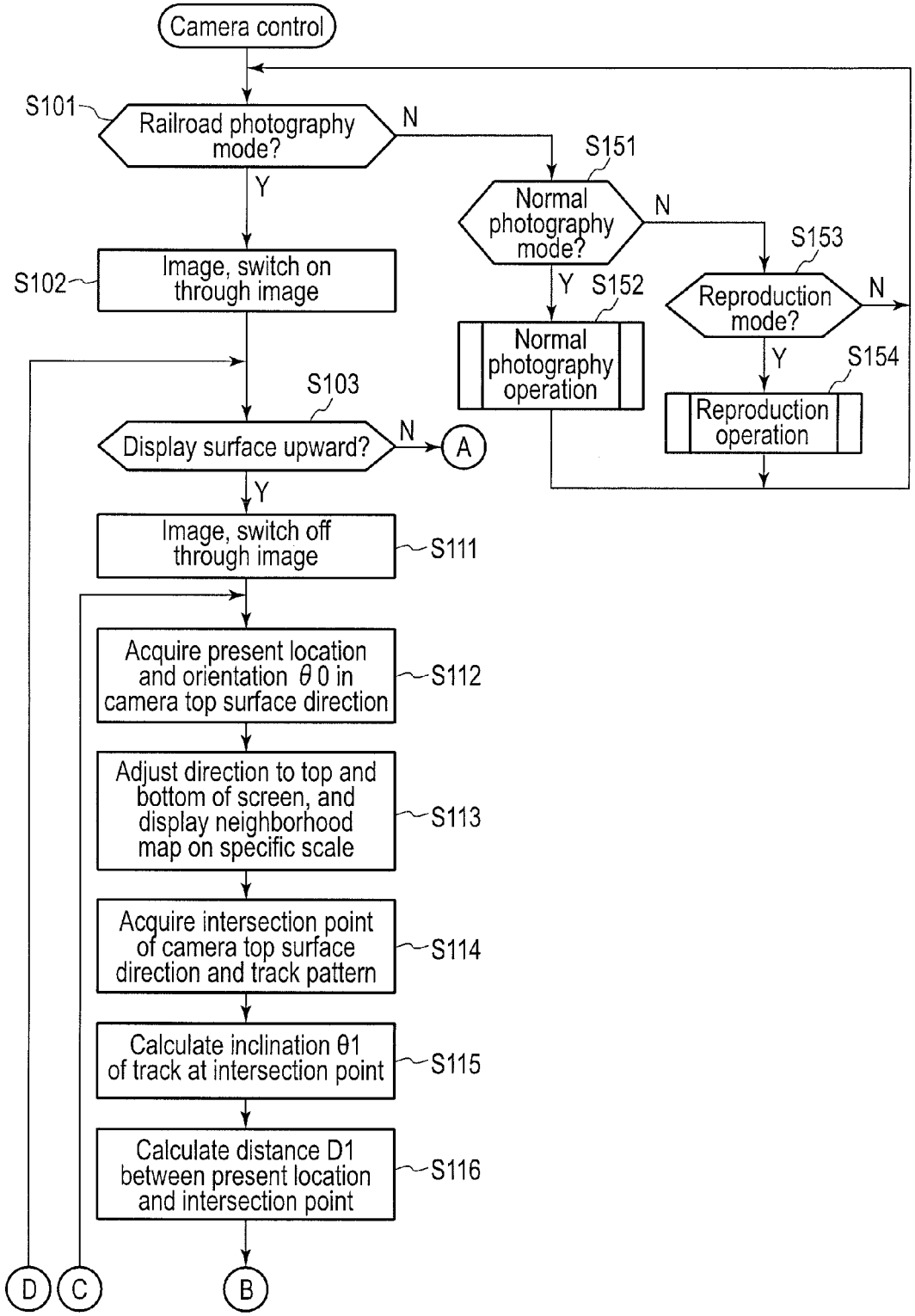
FIGS. 2A and 2B are flowcharts showing an example of processing according to the first embodiment.

A first embodiment of the present invention will be described with reference to the drawings. A digital camera according to the present embodiment is advantageous to, for example, a scene where pictures of trains are taken along a railroad. This digital camera predicts a composition for a passing train at a photographic point in accordance with map information, and displays a predictive image on a display unit. This predictive image permits a photographer to check the composition of a picture to be obtained before the train actually arrives at the photographic point.

A configuration example of the digital camera according to the present embodiment is shown in FIG. 1. As shown in FIG. 1, a digital camera 10 according to the present embodiment comprises an image processing control unit 1, an imaging unit 2, a recording unit 4, a database storage unit 5, an operation unit 6, a GPS unit 7a, an orientation sensor 7b, a gravity sensor 7c, a display unit 8, and a touchpanel 8b. The image processing control unit 1 includes an integrated circuit, and controls each component of the digital camera 10 and processes images as described later.

The imaging unit 2 has, for example, an optical system including lenses, an image pickup device, and an analog-to-digital converter. A subject image which has entered the image pickup device via the optical system is converted to an electrical signal by the image pickup device. This electrical signal undergoes preprocessing including analog-to-digital conversion and predetermined image processing, and an image signal is generated. The imaging unit 2 outputs the created image signal to the image processing control unit 1.

The recording unit 4 records image data processed by the image processing control unit 1. The recording unit 4 includes, for example, a general recording medium connectable to and removable from the digital camera 10. The operation unit 6 includes various buttons and switches such as a release button, and receives various instructions from the photographer. The operation unit 6 outputs the acquired instructions from the photographer to the image processing control unit 1.

A map database 5a, an image database 5b, and a timetable database 5c are stored in the database storage unit 5. The map database 5a includes map information. The image database 5b includes predictive images showing compositions for trains. The timetable database 5c includes information regarding train schedules. The database storage unit 5 outputs various information to the image processing control unit 1 at the request of the image processing control unit 1.

Using the Global Positioning System (GPS), the GPS unit 7a acquires the present location of the digital camera 10. The GPS unit 7a outputs the acquired present location information to the image processing control unit 1. Thus, the GPS unit 7a functions as a position acquisition unit. The orientation sensor 7b detects terrestrial magnetism to acquire orientation information that indicates the direction of the digital camera 10. The orientation sensor 7b outputs the acquired orientation information to the image processing control unit 1. The gravity sensor 7c detects acceleration to acquire posture information that indicates the posture of the digital camera 10 in a vertical direction. The gravity sensor 7c outputs the acquired posture information to the image processing control unit 1.

The display unit 8 includes a display such as a liquid crystal display or an organic electroluminescent display. The display unit 8 displays various images under the control of the image processing control unit 1. For example, through images, obtained images, maps, and predictive train images are displayed on the display unit 8. The touchpanel 8b is provided on the display of the display unit 8, and detects a touch input by the photographer and then outputs the detection result to the image processing control unit 1.

When the digital camera 10 is held so that the release button is vertically upward and the lenses are horizontal, the display surface of the display unit 8 is perpendicular to a horizontal plane. In this case, the direction of the top surface of the camera is vertically upward. In the present embodiment, the direction of the top surface of the digital camera 10 taking various postures is referred to as a camera top surface direction in each posture.

The image processing control unit 1 includes a map information acquisition unit 1a, a composition prediction unit 1b, a display control unit 1d, a field angle determination unit 1e, and a position conversion unit 1f. The map information acquisition unit 1a acquires map information from the map database 5a. The composition prediction unit 1b predicts a composition associated with a train that will pass, in accordance with the map information, the present location acquired by the GPS unit 7a and the orientation sensor 7b, and the orientation of the digital camera 10. The composition prediction unit 1b has a predictive image generation unit 1c which generates an image showing the predicted composition for the train. The predictive image generation unit 1c uses image information included in the image database 5b to generate a predictive image. The display control unit 1d superimposes the predictive image generated by the predictive image generation unit 1c of the composition prediction unit 1b on the through image acquired by the imaging unit 2 to generate an superimposed image, and displays the superimposed image on the display unit 8.

The field angle determination unit 1e acquires information regarding the focal distance of the optical system of the imaging unit 2, and in accordance with the focal distance, calculates an angle of field of the image obtained by the imaging unit 2. The field angle determination unit 1e outputs the calculated angle of field to the composition prediction unit 1b. The composition prediction unit 1b may use the information regarding the angle of field to predict a composition for the train. In accordance with the present location information acquired from the GPS unit 7a, the position conversion unit 1f extracts the map information acquired from the map information acquisition unit 1a, and generates a map to be displayed on the display unit 8. The position conversion unit 1f outputs the generated map to the display control unit 1d, and displays the map on the display unit 8.

Figure 2B:
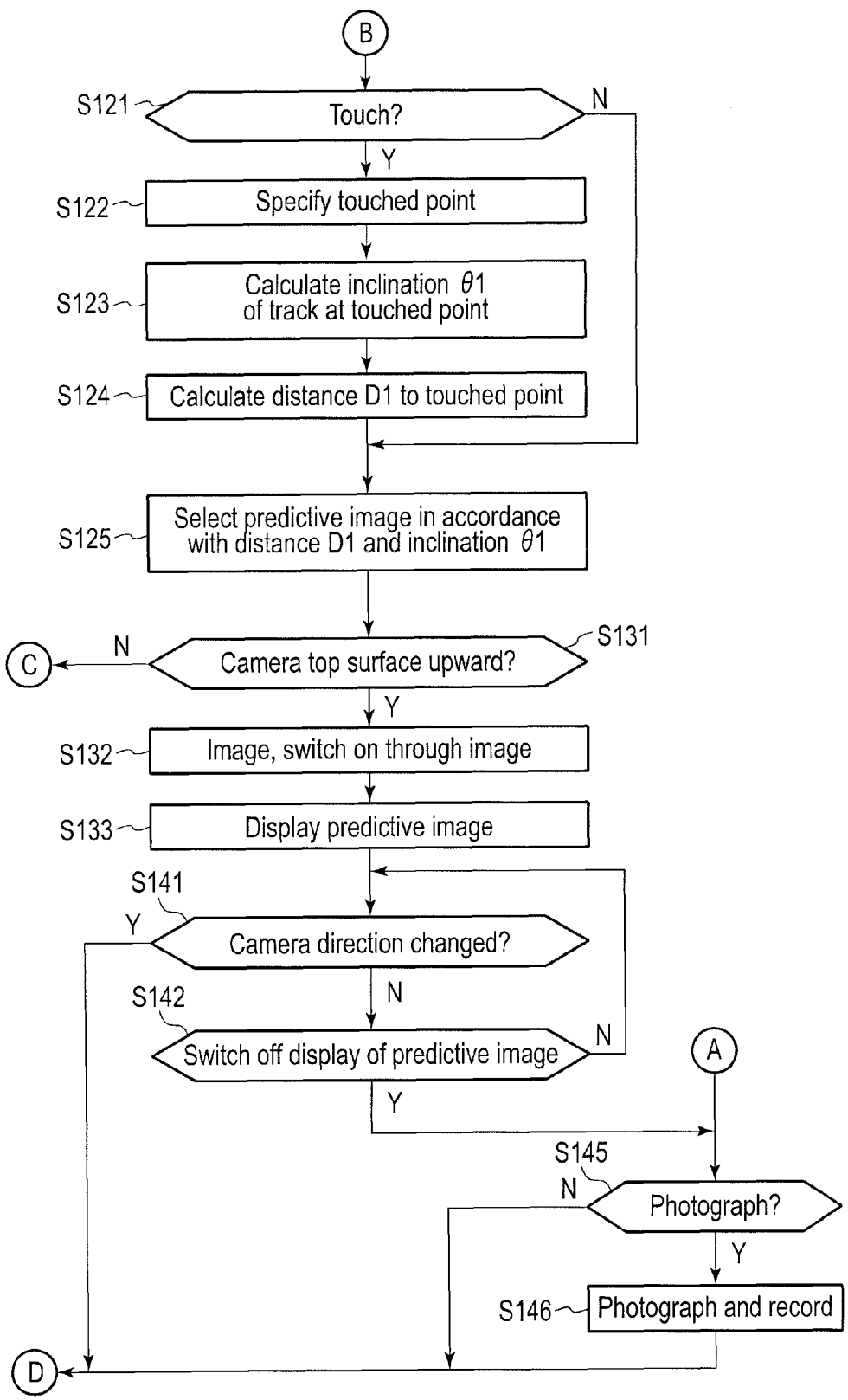

The operation of the digital camera 10 according to the present embodiment is described. Flowcharts of processing performed in the digital camera 10 are shown in FIGS. 2A and 2B. In step S101, the image processing control unit 1 determines whether a railroad photography mode is set. When the image processing control unit 1 determines that the railroad photography mode is set, the processing moves to step S102. In step S102, the image processing control unit 1 causes the imaging unit 2 to start photography. The image processing control unit 1 processes the obtained image to generate a through image, and displays the through image on the display unit 8.

In step S103, the image processing control unit 1 determines whether the display surface of the display unit 8 is upward in accordance with the output from the gravity sensor 7c. When the image processing control unit 1 determines that the display surface of the display unit 8 is not upward, the processing moves to step S145. On the other hand, when the image processing control unit 1 determines that the display surface of the display unit 8 is upward, the processing moves to step S111. It should be appreciated here that the display surface is set to be determined as upward not only when the display surface is strictly horizontal so that a line perpendicular to the display surface is vertically upward, but also when, for example, the line perpendicular to the display surface is within a range of ±20° of the vertically upward direction. Thus, a margin can be set for a conditional value in various determinations in the following cases as well.

In step S111, the image processing control unit 1 finishes the photographic operation performed by the imaging unit 2, and finishes the display of the through image on the display unit 8. In step S112, the image processing control unit 1 acquires information regarding the present location from the GPS unit 7a. The image processing control unit 1 also acquires an orientation θ0 in the camera top surface direction in accordance with the output from the orientation sensor 7b. In step S113, the image processing control unit 1 displays a map of the area around the present location so that the orientation θ0 in the camera top surface direction corresponds to the direction of the upper side of the display unit 8.

The map display is described. In the present embodiment, a map of a range of, for example, 90 m×120 m is displayed on the display unit 8. Data regarding the map is included in the map database 5*a* as map data. The position conversion unit 1*f* of the image processing control unit 1 determines a region of the map to be displayed on the display unit 8 in accordance with the present location and the orientation θ0 in the camera top surface direction. For example, the position conversion unit 1*f* extracts a region of 90 m×120 m including the present location from map data in accordance with the distance recorded on the map and the orientation θ0.

Figure 3:
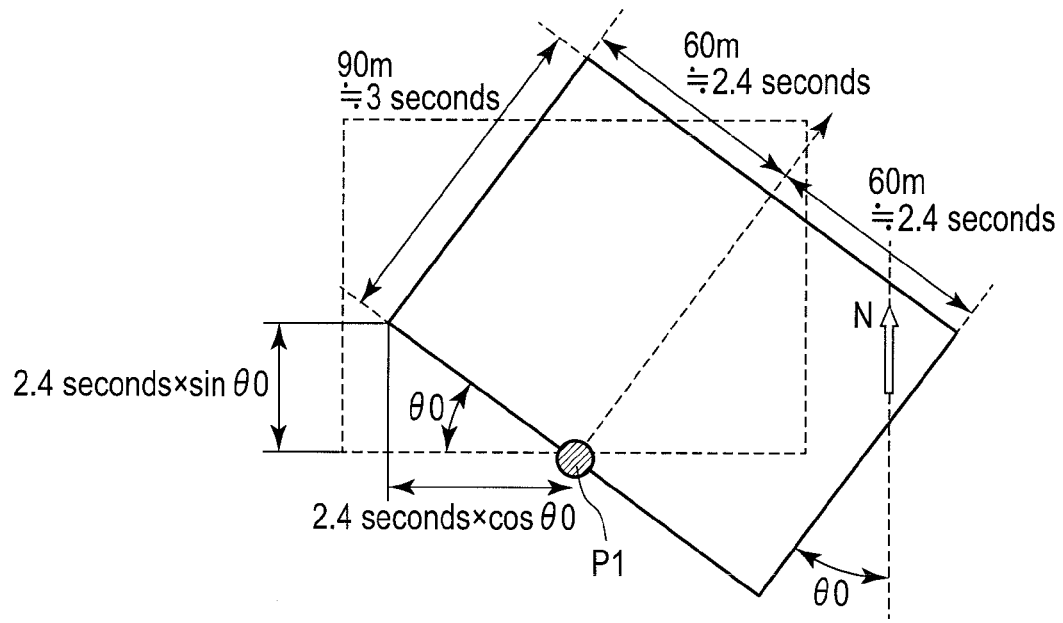
FIG. 3 is a diagram illustrating an example of a method of determining a map region to be displayed on a display unit according to the embodiments.

As the radius of the earth is about 6380 m, one second latitude corresponds to about 30 m. For example, one second longitude at a latitude (of 35 degrees north) near Tokyo corresponds to about 25 m. The latitude and longitude of the present location are acquired by the GPS unit 7*a*, so that the latitudes and longitudes of four corners of the region to be displayed on the display unit 8 with reference to a present location P1 can be calculated from a geometrical relation shown in FIG. 3. Information regarding the latitudes and longitudes thus calculated may be used to determine a region of the map to be displayed on the display unit 8. Although the region of the map to be displayed on the display unit 8 described here is 90 m×120 m, this range can be properly changed.

Figure 4:
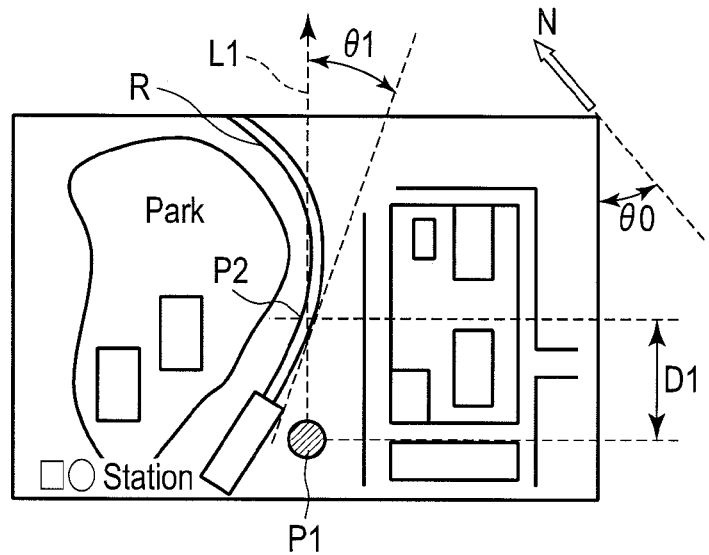
FIG. 4 is a diagram illustrating a method of determining a composition for a passing train by a map according to the first embodiment.

For example, a map shown in FIG. 4 is displayed on the display unit 8. In step S114, the image processing control unit 1 finds an intersection point P2 of a track pattern R and a straight line L1 which passes through the present location P1 indicated by a black circle in FIG. 4 and which shows the camera top surface direction, in the map data displayed on the display unit 8. When there are two or more intersection points as in the example shown in FIG. 4, an intersection point closest to the present location P1, for example, is specified as an intersection point P2. Here, the map data has therein data regarding tracks, and the track pattern R may be specified by the reading of the track data. Even if the map data does not have the track data therein, the track pattern R may be specified so that, for example, a thick and smoothly continuous line is regarded as a track in accordance with the map image. The track pattern R may also be specified by use of the fact that the track pattern R is, for example, a thick and smoothly continuous line extending from a station when the station is used as a standard. The track smoothly curves as compared with roads that cross and bend nearly at right angles, and this fact may be used to specify the track pattern R. When the track pattern is specified in accordance with the map image, track information does not need to be contained in the map in advance, so that the limitation associated with the map data is eliminated.

In step S115, the image processing control unit 1 calculates an inclination θ1 of the track pattern R at the intersection point P2. In step S116, the image processing control unit 1 calculates a distance D1 between the present location P1 and the intersection point P2 in accordance with the map information. That is, the intersection point P2 calculated in step S114 is used as a photographic point, and angle θ1 between a photography direction and the track at this photographic point, and distance D1 from the photographer to the photographic point are specified. In this way, angle θ1 and distance D1 are specified in accordance with the map.

In step S121, the image processing control unit 1 determines whether the touchpanel 8*b* is touched. When the image processing control unit 1 determines that the touchpanel 8*b* is not touched, the processing moves to step S125. On the other hand, when the image processing control unit 1 determines that the touchpanel 8*b* is touched, the processing moves to step S122. In step S122, the image processing control unit 1 specifies the position touched in step S121 as a touched point Pt. In step S123, the image processing control unit 1 calculates the inclination θ1 of the track pattern R at the touched point. In step S124, the image processing control unit 1 calculates the distance between the present location P1 and the touched point Pt as distance D1. That is, when the touchpanel 8*b* is touched, the image processing control unit 1 regards the touched point Pt specified in step S122 as a photographic point, and thus specifies angle θ1 between a photography direction and the track at this photographic point, and distance D1 from the photographer to the photographic point. When a point other than the track is touched, the processing may move to step S125.

In step S125, the image processing control unit 1 selects a predictive image of the train from the images stored in the image database 5*b* in accordance with distance D1 and angle θ1. For example, images schematically shown in FIGS. 5A to 5G and FIGS. 6A to 6G are recorded in the image database 5*b*. That is, for example, when distance D1 is less than 50 m, a predictive image is selected from the images shown in FIGS. 5A to 5G. Here, for example, when θ1 is −20° or more and 20° or less, the image shown in FIG. 5A is selected. When θ1 is more than 20° and 40° or less, the image shown in FIG. 5B is selected. When θ1 is more than 40° and 60° or less, the image shown in FIG. 5C is selected. When θ1 is more than 60° and 90° or less, the image shown in FIG. 5D is selected. When θ1 is −40° or more and less than −20°, the image shown in FIG. 5E is selected. When θ1 is −60° or more and less than −40°, the image shown in FIG. 5F is selected. When θ1 is −90° or more and less than −60°, the image shown in FIG. 5G is selected.

Figure 6A:
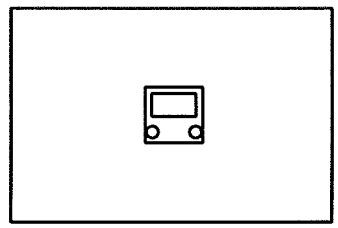
FIGS. 6A, 6B, 6C, 6D, 6E, 6F, and 6G are diagrams showing examples of predictive images of the train included in the image database according to the first embodiment.
Figure 6B:
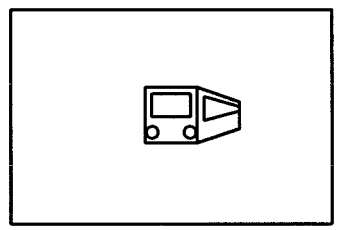
Figure 6E:
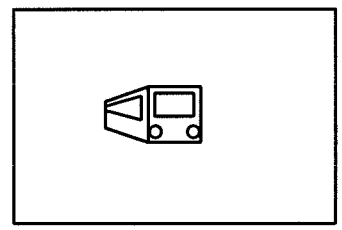
Figure 6C:
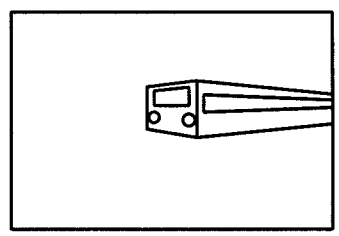
Figure 6F:
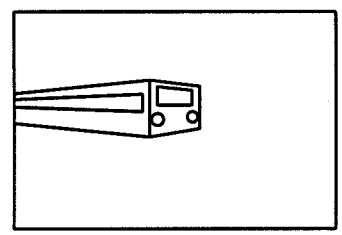
Figure 6D:
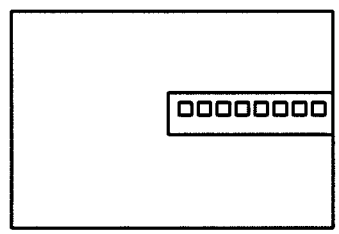
Figure 6G:
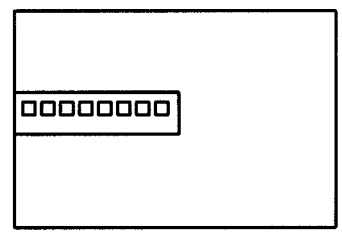

For example, when distance D1 is 50 m or more, a predictive image is selected from the images shown in FIGS. 6A to 6G. Here, for example, when θ1 is −20° or more and 20° or less, the image shown in FIG. 6A is selected. When θ1 is more than 20° and 40° or less, the image shown in FIG. 6B is selected. When θ1 is more than 40° and 60° or less, the image shown in FIG. 6C is selected. When θ1 is more than 60° and 90° or less, the image shown in FIG. 6D is selected. When θ1 is −40° or more and less than −20°, the image shown in FIG. 6E is selected. When θ1 is −60° or more and less than −40°, the image shown in FIG. 6F is selected. When θ1 is −90° or more and less than −60°, the image shown in FIG. 6G is selected.

In the example shown here, the predictive image varies depending on whether distance D1 is less than 50 m or is 50 m or more. However, more images are prepared in the image database 5*b* in accordance with the distance. An optimum predictive image may be selected from a large number of predictive images in accordance with the distance. More predictive images are also prepared for angle θ1, and an optimum predictive image may be selected from these predictive images. A predictive image is selected in accordance with distance D1 and angle θ1, so that a correct composition for the train which will actually pass the photographic point can be estimated.

In step S131, the image processing control unit 1 determines whether the top surface of the camera in which the release button is disposed is upward. When the image processing control unit 1 determines that the top surface is not upward, the processing moves back to step S112. When the image processing control unit 1 determines that the top surface is upward, the processing moves to step S132. In step S132, the image processing control unit 1 causes the imaging unit 2 to start photography. The image processing control unit 1 processes the obtained image to generate a through image, and displays the through image on the display unit 8. In step S133, the image processing control unit 1 superimposes the predictive image selected in step S125 on the through image, and displays the superimposed image on the display unit 8.

The processing then moves to step S141. The predictive image is superimposed and displayed on the through image, so that the photographer viewing this image can easily examine the composition of the picture including the train that will pass in the future.

In step S141, the image processing control unit 1 determines in accordance with the output from the orientation sensor 7b whether the direction of the digital camera 10 is changed. When the image processing control unit 1 determines that the direction is changed, the processing moves back to step S103. On the other hand, when the image processing control unit 1 determines that the direction is not changed, the processing moves to step S142. In step S142, the image processing control unit 1 determines whether an instruction to switch off the display of the predictive image is input. When the switch-off instruction is not input, the processing moves back to step S141. On the other hand, when the switch-off instruction is input, the processing moves to step S145. Although the display of the predictive image is finished by the instruction from the user in the case described here, the display of the predictive image may be finished, for example, when a predetermined time has elapsed. In step S141, the direction of the digital camera 10 is changed and then the processing moves back to step S103 because the display of the predictive image described later is not correct when the direction is changed. The predictive image may be adjusted in conformity to the change of the direction of the digital camera 10 so that the predictive image will be properly updated in accordance with the change of the direction of the digital camera 10.

In step S145, the image processing control unit 1 determines whether an instruction for photography is input, for example, whether the release button is pressed. When the image processing control unit 1 determines that the instruction for photography is not input, the processing moves back to step S103. On the other hand, when the image processing control unit 1 determines that the instruction for photography is input, the processing moves to step S146. In step S146, the image processing control unit 1 causes the imaging unit 2 to perform photographic operation to acquire data. The image processing control unit 1 performs necessary image processing for the obtained data, and generates processed image data. The image processing control unit 1 records the image data in the recording unit 4.

When the image processing control unit 1 determines in step S101 that the railroad photography mode is not set, the processing moves to step S151. In step S151, the image processing control unit 1 determines whether a normal photography mode is set. When the normal photography mode is not set, the processing moves to step S153. On the other hand, when the normal photography mode is set, the processing moves to step S152. In step S152, the image processing control unit 1 performs a normal photography operation. The normal photography operation is a photography operation in a general digital camera in which the imaging unit 2 performs an imaging operation in response to, for example, the photography instruction issued with the release button to acquire an image of the subject. The normal photography operation is not described here. After the normal photography operation, the processing moves back to step S101.

In step S153, the image processing control unit 1 determines whether a reproduction mode is set. When the reproduction mode is not set, the processing moves back to step S101. On the other hand, when the reproduction mode is set, the processing moves to step S154. In step S154, the image processing control unit 1 performs a predetermined reproduction operation. The reproduction operation is a reproduction operation in a general digital camera in which a selected image is displayed on the display unit 8 in accordance with the image data in the recording unit 4. The reproduction operation is not described here. After the reproduction operation, the processing moves back to step S101.

Figure 9:
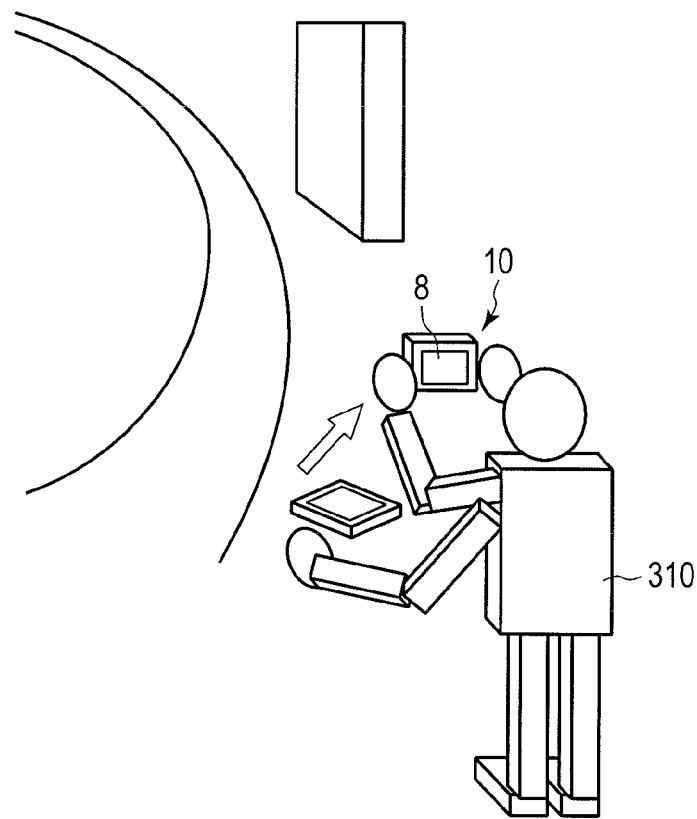
FIG. 9 is a diagram illustrating an example of how to use the digital camera according to the first embodiment.
Figure 10:
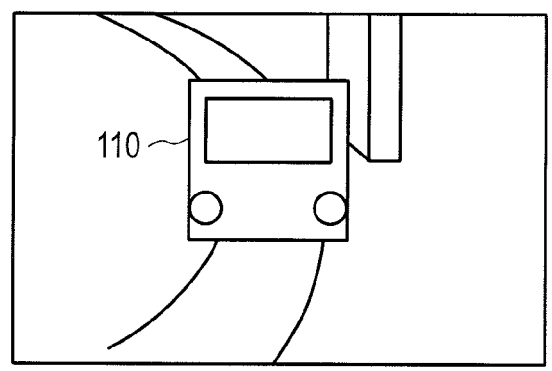
FIG. 10 is a diagram showing an example of a predictive image displayed on the display unit according to the first embodiment.

The railroad photography mode according to the present embodiment is used as below. That is, for example, as shown in FIG. 7, a photographer 310 holds the digital camera 10 to keep the display surface of the display unit 8 upward, for example, at a place by the track where the photographer has visited for the first time. At the same time, the digital camera 10 acquires the present location and the camera top surface direction, and displays an image including the map shown in FIG. 8 on the display unit 8. Here, as shown in FIG. 9, the photographer 310 rotates the digital camera 10 around a line parallel to the display surface of the display unit 8, that is, holds up the digital camera 10 straight to keep the digital camera 10 horizontal. Then an image in which a predictive image 110 is superimposed on a through image is displayed on the display unit 8, for example, as shown in FIG. 10.

Figure 11:
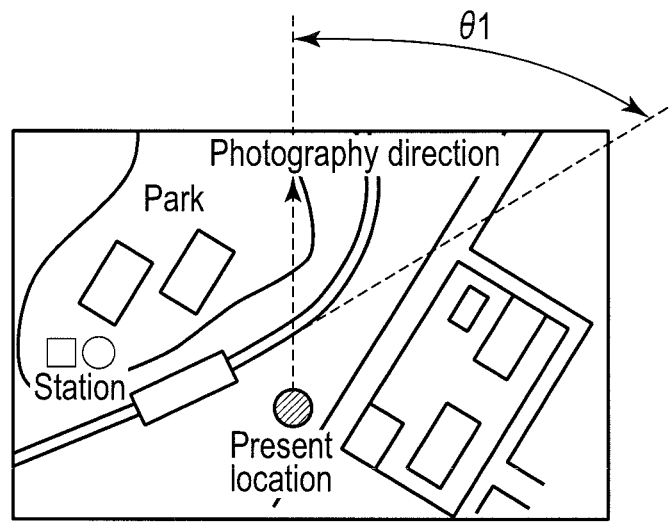
FIG. 11 is a diagram showing an example of a map image displayed on the display unit according to the first embodiment.
Figure 12:
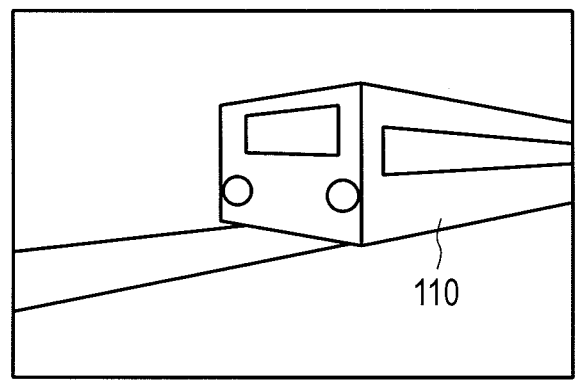
FIG. 12 is a diagram showing an example of a predictive image displayed on the display unit according to the first embodiment.

When the photographer 310 changes the camera top surface direction while the display surface of the display unit 8 is upward, an image, for example, shown in FIG. 11 is displayed on the display unit 8 in response to the change of the camera top surface direction. In this case, angle θ1 between the photography direction and the track at the photographic point is greater than that shown in FIG. 8. Therefore, if the digital camera 10 is horizontally directed from the condition shown in FIG. 11 in which the image is displayed on the display unit 8, an image shown in FIG. 12 is displayed on the display unit 8. That is, the predictive image 110 is superimposed and displayed on the through image. Here, the predictive image 110 is different from the predictive image 110 shown in FIG. 10.

According to the present embodiment, the map information is used to predict a composition for a passing vehicle. An image of a vehicle showing the predicted composition is superimposed and displayed on a through image. Consequently, in railroad photography, the photographer can examine the composition of the picture before the vehicle arrives. A running train is popular but provides limited opportunities for photography, and is therefore one of the subjects that are difficult for inexperienced photographers to photograph. The technique according to the present embodiment helps the photographer to be successful in the railroad photography with limited picture taking opportunities.

Second Embodiment

A second embodiment of the present invention is described. Here, the differences between the first embodiment and the second embodiment are described, and the same parts are denoted with the same reference signs and are not described. In the present embodiment, a predictive image is determined in consideration of an angle of field. The angle of field changes especially when a zoom lens is used, so that the angle of field needs to be taken into consideration as in the present embodiment. If the angle of field is taken into consideration, the position of a vehicle in a photographic image can be more accurately predicted.

For example, the angle of field of a camera is about 46° when the focal distance is 50 mm in 35 mm film, and the angle of field of the camera is about 12° when the focal distance is 200 mm. These angles of field are values associated with the opposite angle of the image. Therefore, when the aspect ratio is, for example, 4:3, the angle of field in the horizontal direction is 80% of the angle of field of the opposite angle. The aspect ratio is for example, 16:9 or 3:2 in some cases. Consequently, a horizontal angle of field θt is about 40° when the focal distance is 50 mm, and the horizontal angle of field θt is about 10° when the focal distance is 200 mm.

In the present embodiment, when a map is displayed with the display surface of the display unit 8 directed upward, a horizontal angle of field is calculated in accordance with the focal distance, and the horizontal angle of field is superimposed and displayed on the map, as shown in FIG. 13.

The horizontal angle of field θt obtained as described above is used to determine, for example, the width of the vehicle. For example, the vehicle is photographed in front as shown in FIG. 14. That is, the distance from the digital camera 10 to the front of a vehicle 330 is D1, and the horizontal width of an image acquired at distance D1 is H1. The width H1 is represented by Equation (1) by the use of the horizontal angle of field θt.

$$H1=2\cdot D1\cdot \tan(\theta t/2) \quad (1)$$

A vehicle width H2 which is the width of the vehicle 330 is generally about 3 meters. Therefore, as shown in FIG. 15, when the width of the image is H3, a width H4 of the vehicle in this image is represented by Equation (2) by the use of H1 and H2.

$$H4=H3\times H2/H1 \quad (2)$$

In the present embodiment, the width H4 thus obtained is used to create a predictive image, and the predictive image is superimposed and displayed on a through image.

The relation between the length of the vehicle and the angle of field can also be calculated as follows. This is described with reference to FIG. 16. The position of the digital camera 10 is Pa. The position of the front of the vehicle 330 is Pb. The position of the rear end of the vehicle 330 is Pd. The intersection point of a straight line which passes through Pa and Pb and a line which is perpendicular to the straight line and which passes through Pd is Pc. As in the case described above, the distance between Pa and Pb is D1. The angle between the photography direction, that is, a straight line PaPc and a track, that is, the vehicle 330 is θt. In general, the length of one vehicle is about 20 [m]. Therefore, the distance between Pb and Pc is 20×cos θt [m]. The distance between Pc and Pd is 20×sin θ1 [m]. Consequently, an angle θC between a straight line PdPa and a straight line PcPa is represented by Equation (3).

$$\theta c=\arctan(20\times\sin \theta 1/(D1+20\times\cos \theta 1)) \quad (3)$$

One whole vehicle is contained in the angle of field, for example, as shown in FIG. 5B, if θc≤θt/2 wherein θ1 is the horizontal angle of field obtained by the digital camera 10. On the other hand, if θc>θt/2, one whole vehicle is not contained in the angle of field, for example, as shown in FIG. 5C. A predictive image may be created on the basis of this relation between θt and θc.

Although one vehicle is shown in the case described here by way of example, similar calculations are also performed when a plurality of vehicles are connected. When a predictive image of a plurality of connected vehicles is created, calculations can be performed in consideration of the vehicles arrayed along a track. The length of a train, that is, the number of vehicles can be determined by timetable information. The length of a train may be determined by the length of a station platform included in the map information.

Figure 17A:
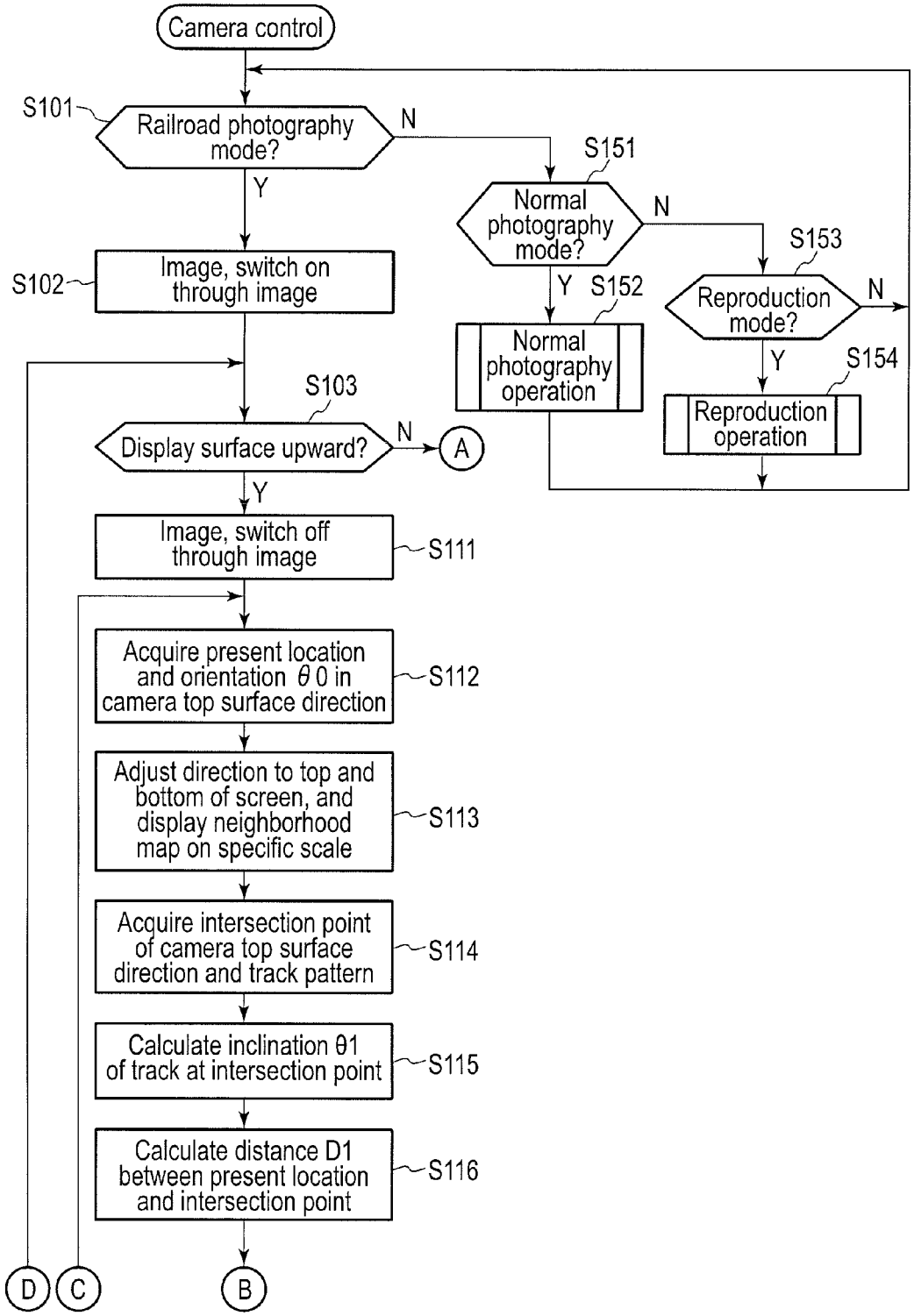
FIGS. 17A and 17B are flowcharts showing an example of processing according to the second embodiment.
Figure 17B:
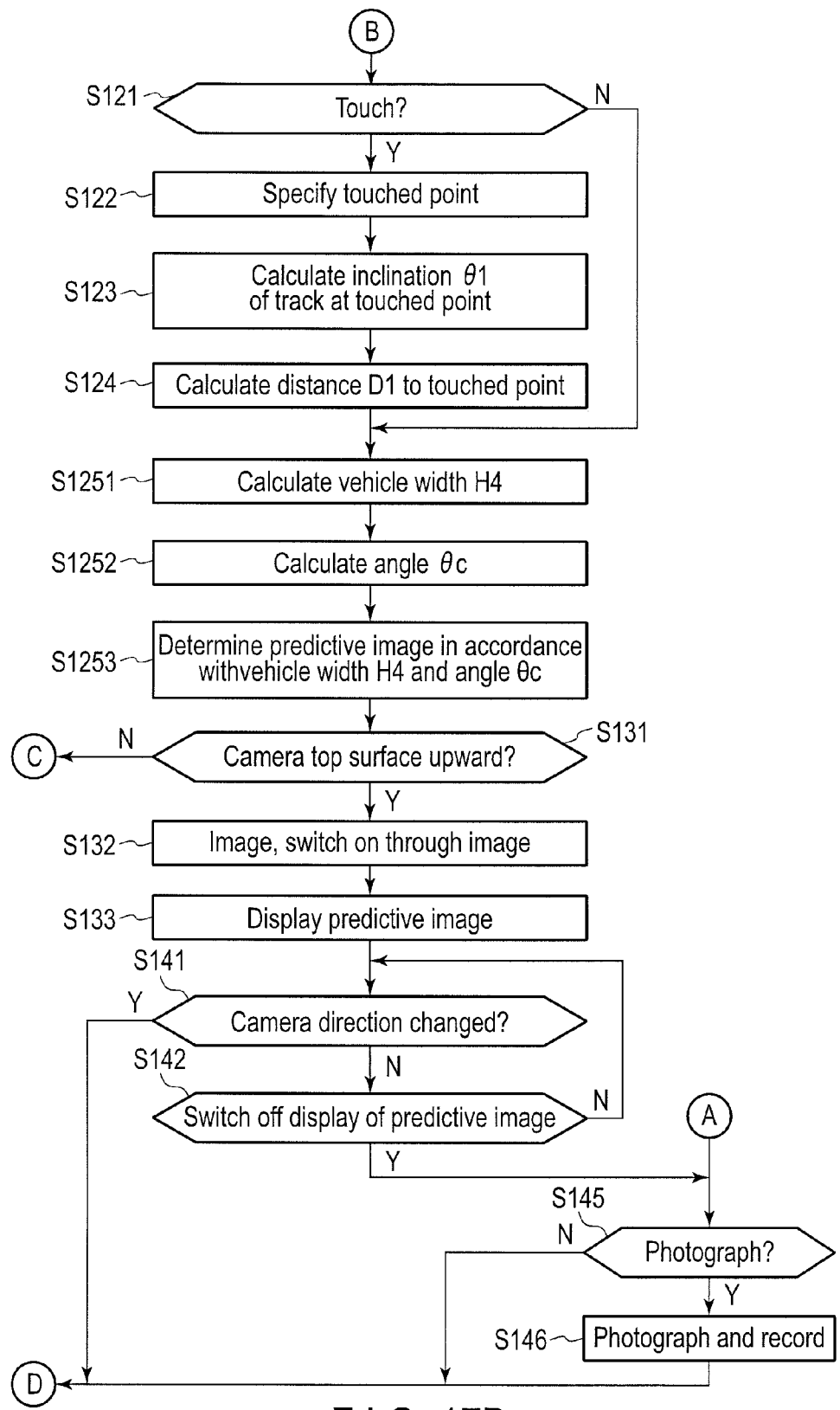

An example of processing performed by the image processing control unit 1 according to the present embodiment is described with reference to FIGS. 17A and 17B. The processing according to the present embodiment is mostly similar to the processing according to the first embodiment described with reference to FIGS. 2A and 2B. The differences between the present embodiment and the first embodiment described with reference to FIGS. 2A and 2B are only described. Step S125 according to the first embodiment is replaced by step S1251 to step S1253 in the present embodiment as follows.

The inclination θ1 of the track is calculated in step S115 or step S123, and distance D1 is calculated in step S116 or step S124, and then the next processing is performed. That is, in step S1251, the image processing control unit 1 calculates the value H4 associated with the width of the vehicle in accordance with the angle of field θt and distance D1, as has been described with reference to FIG. 14 and FIG. 15. In step S1252, the image processing control unit 1 calculates angle θc shown in FIG. 16 in accordance with, for example, angle θ1 formed by the vehicle 330, as has been described with reference to FIG. 16. In step S1253, the image processing control unit 1 determines a predictive image in accordance with the vehicle width H4 and angle θc. The processing then moves to step S131. In other respects, the processing is similar to that in the first embodiment.

According to the present embodiment, a more accurate predictive image can be superimposed and displayed on the display unit 8 than in the first embodiment.

Although the front of the train is located in the center of the acquired image in the cases described above by way of example in the first embodiment and the second embodiment, this is not a limitation. The digital camera 10 may prepare, for example, predictive images in which a train is located at various positions along the track, and superimpose and display various patterns of predictive images on a through image. The digital camera 10 may also superimpose and display, on a through image, moving images in which the vehicle moves along the track.

Figure 18:
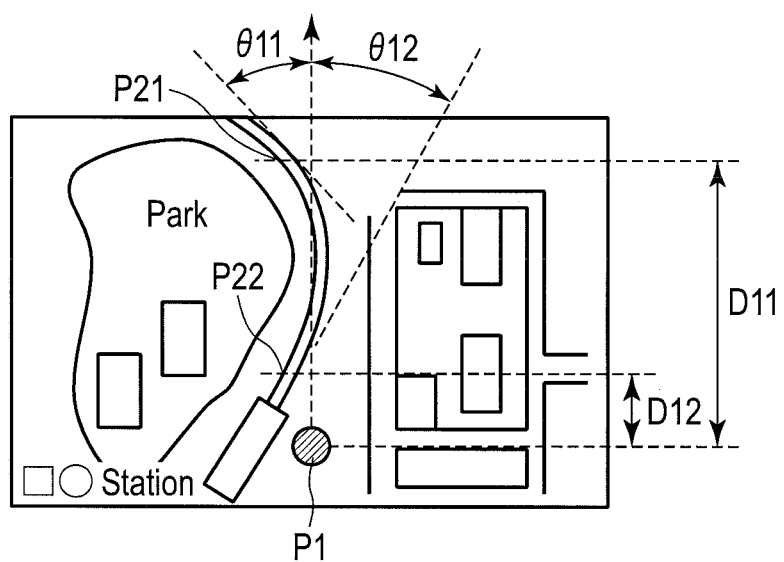
FIG. 18 is a diagram illustrating a method of determining a composition for a passing train by a map according to a modification.

In these cases, the distance between the present location and each point of the track, and the inclination of the track at this point are calculated so that a predictive image can be selected as in the first embodiment and the second embodiment. For example, a drawing corresponding to FIG. 4 is shown in FIG. 18. As shown in FIG. 18, suppose that a train passes a position P21. In this case, the distance from the present location P1 is D11, and the angle of the train is θ11. Meanwhile, suppose that the train passes a position P22. In this case, the distance from the present location P1 is D12, and the angle of the train is θ12. A predictive image can be selected in accordance with these values.

In the first embodiment or the second embodiment, the digital camera 10 may acquire timetable information, and present the passage time of the vehicle in accordance with the timetable information. For example, the digital camera 10 may not only display a prediction screen but also display how many minutes later the vehicle will pass the photographic point. As a vehicle image displayed as the predictive image, a typical vehicle image may be used, or an image of a vehicle close to the vehicle that will actually pass may be used in accordance with, for example, firstly, the track information or the timetable information, and secondly, the kind of vehicle that will pass on the track.

In the embodiment described above by way of example, the digital camera 10 has the map database 5a, the image database 5b, and the timetable database 5c. However, this is not a limitation. The included information may be partly or totally configured to be acquired from outside the digital camera 10, for example, via the Internet.

In the cases described above, the digital camera 10 superimposes and displays the predictive image of the train on a through image in accordance with the track information on the map as far as the railroad photography is concerned. The technique according to the embodiments described above is not limited to the railroad photography and is also applicable to various kinds of photography. The digital camera according to the embodiments can create predictive images of the take-off and landing of a plane in accordance with information on the runways at an airport on the map, and superimpose and display the predictive images on a through image. The digital camera according to the embodiments can create a predictive image of a passing bus in accordance with information on a bus line on the map, and superimpose and display the predictive image on a through image. The digital camera according to the embodiments can create a predictive image of a running athlete in accordance with information on a track in an athletic field on the map, and superimpose and display the predictive image on a through image. The digital camera according to the embodiments can also create and display a predictive image of, for example, a racing car running on a circular course or a horse running on a racetrack. When the movement path of a moving subject can thus be read from the map information, the technique according to the embodiments is applicable. In each case, the photographer can examine a composition including a subject of interest before the subject of interest arrives at the photographic point.

The target is not exclusively an object having a limited movement route such as a train on a track, and may be, for example, an automobile at an intersection. The automobile enters the intersection from various directions. However, as the directions in which the automobile enters are limited by roads, the automobile entrance directions can be predicted in accordance with road information included in the map. Thus, even if there are a plurality of entrance directions, the entrance directions are limited. If the entrance directions are predictable, the technique according to the embodiments can be used.

The technique according to the embodiments is not limited to photography, and is applicable to other uses. That is, the technique according to the embodiments is also applied to a display device which superimposes and displays, on an image obtained by the imaging unit, a predictive image of an object entering a region imaged by the imaging unit. This display device can also be used to present, for example, the direction and way in which an automobile, a bicycle, or a person enters an intersection, and warn the user of danger. This display device can also be used in various presentations or games. The technique according to the embodiments can also be used in various other scenes where augmented reality is used.

The processing sequences shown in the flowcharts are illustrative only, and can be suitably changed without departing from the spirit of the invention. Although the digital camera has been described by way of example in the embodiments, the technique shown herein is applicable to various imaging devices such as a camera-equipped smartphone.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An imaging device comprising:
an imaging unit configured to acquire an image including a subject of interest within an imaging range, wherein the subject of interest is a train;
a display unit configured to display the image;
a position acquisition unit configured to acquire a present location of the imaging device;
a map information acquisition unit configured to acquire map information including the present location;
a composition prediction unit configured to calculate a predictive composition based on the present location, the map information, and track information included in the map information; and
a display control unit configured to cause the display unit to display the predictive composition.

2. The imaging device according to claim 1, wherein the composition prediction unit acquires the track information from a map image based on the map information.

3. The imaging device according to claim 1, wherein the composition prediction unit calculates a distance to the train and an angle formed by the train with a photography direction based on the track information, and calculates the predictive composition based on the distance and the angle.

4. The imaging device according to claim 1, wherein
the composition prediction unit includes a predictive image generation unit configured to generate a predictive image showing the subject of interest based on the predictive composition, and
the display control unit causes the display unit to display an image in which the predictive image is superimposed on the image obtained by the imaging unit.

5. An imaging device comprising:
an imaging unit configured to acquire an image including a subject of interest within an imaging range, wherein the subject of interest is an automobile;
a display unit configured to display the image;
a position acquisition unit configured to acquire a present location of the imaging device;
a map information acquisition unit configured to acquire map information including the present location;
a composition prediction unit configured to (1) calculate a distance to the automobile and an angle formed by the automobile with a photography direction based on road information included in the map information, and (2) calculate a predictive composition based on the present location, the distance and the angle; and
a display control unit configured to cause the display unit to display the predictive composition.

6. The imaging device according to claim 5, wherein the composition prediction unit acquires the road information from a map image based on the map information.

7. An imaging device comprising:
an imaging unit configured to acquire an image including a subject of interest within an imaging range;
a display unit configured to display the image;
a position acquisition unit configured to acquire a present location of the imaging device;
a map information acquisition unit configured to acquire map information including the present location;
a composition prediction unit configured to calculate a predictive composition based on the present location and the map information;
a display control unit configured to cause the display unit to display the predictive composition; and
a field angle calculation unit configured to calculate the imaging range in accordance with a setting of the imaging unit,
wherein the composition prediction unit calculates the predictive composition by using the imaging range calculated by the field angle calculation unit.

8. A method for use in an imaging device, the method comprising:

acquiring, with the imaging device, an image including a subject of interest within an imaging range, wherein the subject of interest is a train;

acquiring, with the imaging device, a present location of the imaging device;

acquiring, with the imaging device, map information including the present location;

calculating, with the imaging device, a predictive composition based on the present location, the map information, and track information included in the map information; and displaying, on a display unit of the imaging device, the predictive composition.

9. The method according to claim 8, wherein the track information is acquired from a map image based on the map information.

10. The method according to claim 8, wherein the act of calculating a predictive composition includes (1) calculating a distance to the train and an angle formed by the train with a photography direction based on the track information, and (2) calculating the predictive composition based on the distance and the angle.

11. The method according to claim 8 further comprising:

generating, with the imaging device, a predictive image showing the subject of interest based on the predictive composition; and displaying, on the display unit of the imaging device, an image in which the predictive image is superimposed on the image obtained by the imaging unit.

12. A method for use in an imaging device, the method comprising:

acquiring, with the imaging device, an image including a subject of interest within an imaging range, wherein the subject of interest is an automobile;

displaying, on a display unit of the imaging device, the image;

acquiring, with the imaging device, a present location of the imaging device;

acquiring, with the imaging device, map information including the present location;

calculating, with the imaging device, a distance to the automobile and an angle formed by the automobile with a photography direction based on road information included in the map information;

calculating, with the imaging device, a predictive composition based on the present location, the distance to the automobile and the angle formed by the automobile with the photography direction; and displaying, on a display unit of the imaging device, the predictive composition.

13. The method according to claim 12, wherein the act of calculating the composition prediction unit acquires the road information from a map image based on the map information.

14. A method for use in an imaging device, the method comprising:

acquiring, with the imaging device, an image including a subject of interest within an imaging range;

displaying, on a display unit of the imaging device, the image;

acquiring, with the imaging device, a present location of the imaging device;

acquiring, with the imaging device, map information including the present location;

calculating, with the imaging device, an imaging range in accordance with a setting of the imaging unit;

calculating, with the imaging device, a predictive composition based on the imaging range, the present location, and the map information; and displaying, on the display unit of the imaging device, the predictive composition.

* * * * *